April 9, 1963 H. G. NISSEN ETAL 3,084,616
HEATING AND ROASTING DEVICE
Filed Feb. 16, 1959 3 Sheets-Sheet 1

INVENTORS
HANS G. NISSEN
BY ALEXANDER I. MARTIN

ATTORNEY.

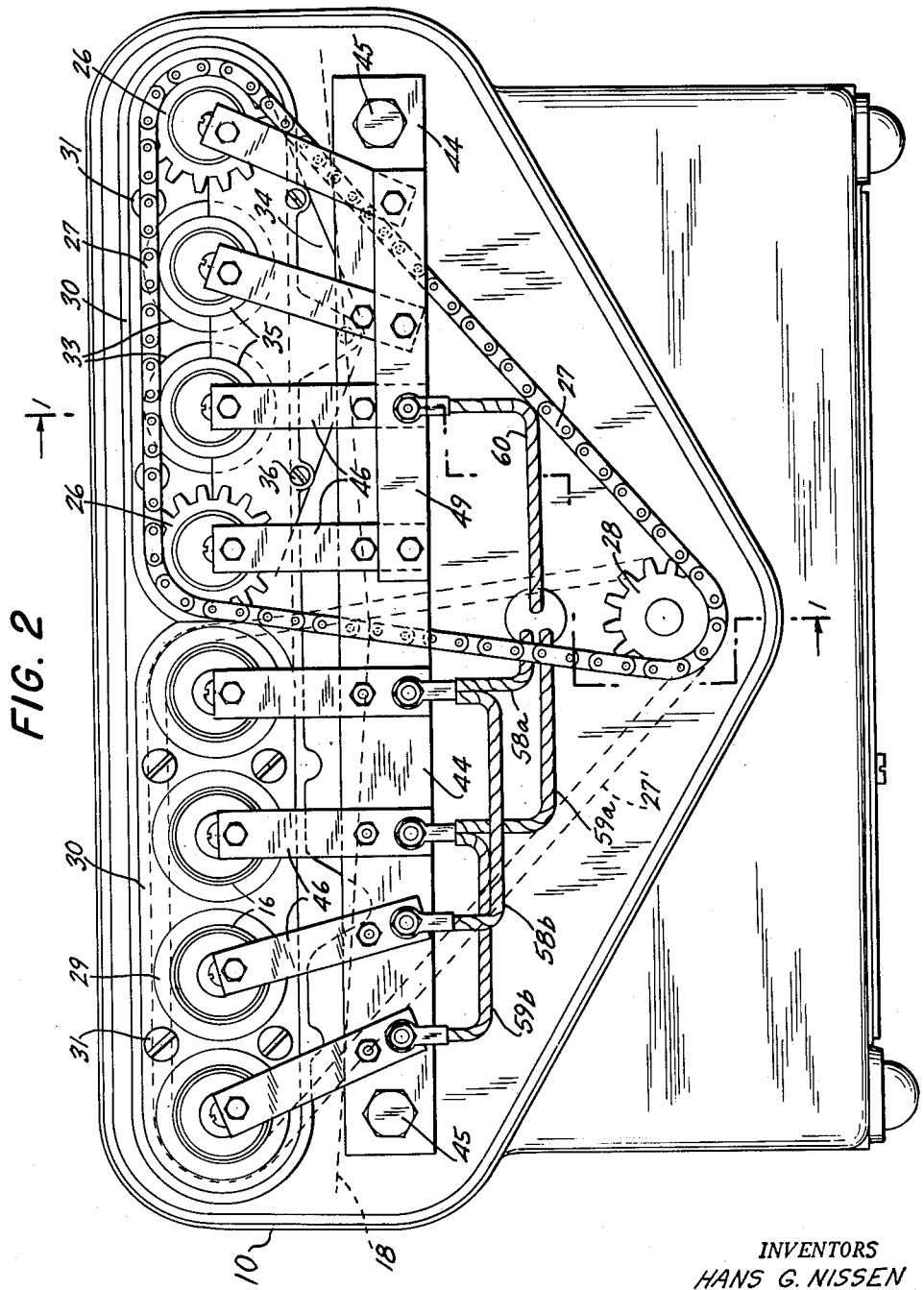

April 9, 1963 H. G. NISSEN ETAL 3,084,616
HEATING AND ROASTING DEVICE
Filed Feb. 16, 1959 3 Sheets-Sheet 3
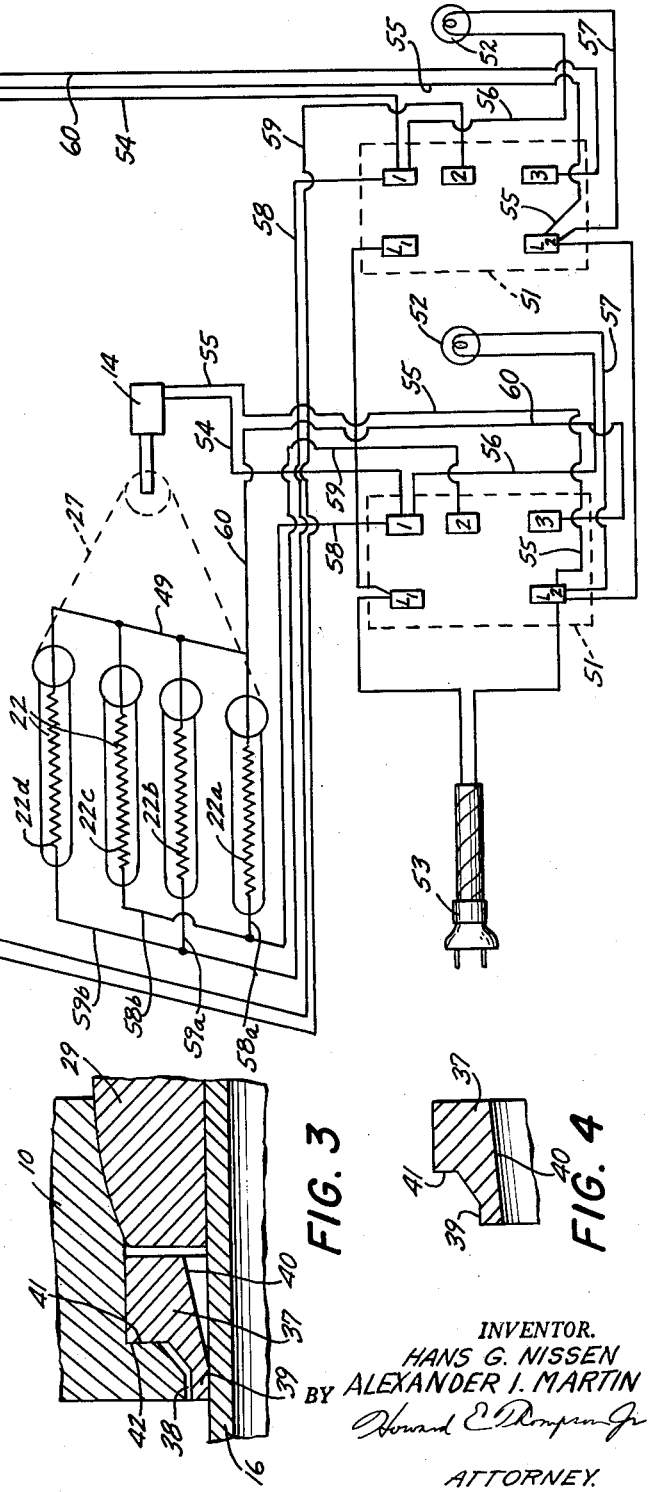
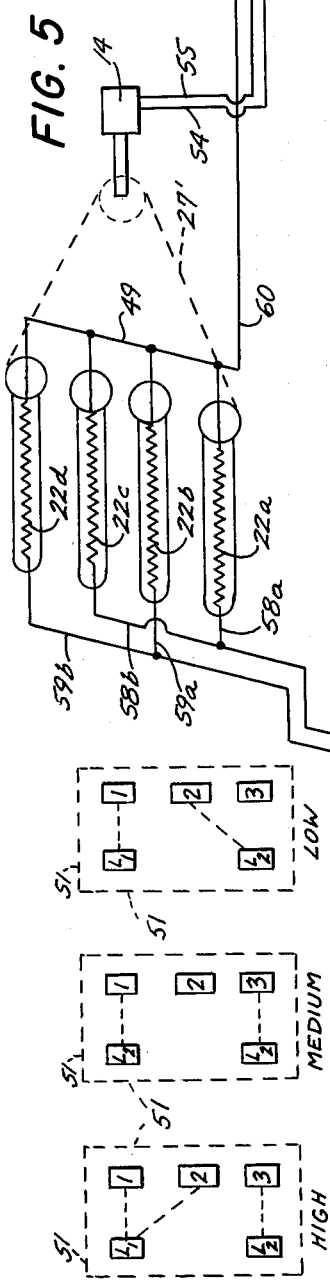
INVENTOR.
HANS G. NISSEN
BY ALEXANDER I. MARTIN
Howard E Thompson Jr
ATTORNEY.

United States Patent Office 3,084,616
Patented Apr. 9, 1963

3,084,616
HEATING AND ROASTING DEVICE
Hans G. Nissen and Alexander I. Martin, Flushing, N.Y., assignors, by mesne assignments, to Yvonne De Sousa, Levittown, N.Y.
Filed Feb. 16, 1959, Ser. No. 793,328
6 Claims. (Cl. 99—423)

This invention relates to a device for heating and roasting essentially cylindrical articles while rotatably supporting such articles on rotatable heated rolls. More particularly, the invention relates to a device of the character described which is adapted for use as a grill in the cooking of frankfurters, sausages and other essentially cylindrical articles of food.

The principle of heating or roasting essentially cylindrical food articles such as frankfurters by rotatably supporting the same on rotating heating rolls is not new in the art, one form of such roasting device having been disclosed in U.S. Patent No. 2,185,979 issued January 2, 1940. Indeed such roasting devices have had rather extensive use in restaurants and lunch rooms where quantities of frankfurters and the like must be served. Devices of this type which have heretofore been available, however, leave much to be desired from the standpoint of safety and efficiency in operation. Problems arise from various sources, such as change in dimensions of the elongated heating elements, adverse effect of heat within the unit upon wiring and electrical control mechanisms, and difficulty in preventing grease which necessarily collects on the rotating rolls from finding its way into the mechanism. Such penetration of the mechanism by grease can be objectionable and dangerous both as a health hazard and a fire hazard.

An objective of the present invention is to provide an improved heating and roasting device of the class described which although simple and economical in construction has markedly enhanced sanitary characteristics and provides means for effectively isolating or thermally insulating the heating elements from wiring and electrical controls, while furnishing at all times positive and compensating support for the elongated heating elements.

Briefly described, the improved features in accordance with the present invention comprise in a device of the character described an elevated arrangement of rotatable heating rolls to permit complete access thereto for cleaning purposes and the like, effective drip collecting means for grease accumulating on the rolls, special sealing means for positioning the rotating rolls in the body or casing of the device in a manner to prevent entry of grease from said rolls, resilient means for tensionally supporting elongated heating elements passing through said rolls, with said resilient means providing electrical leads of low heat conductivity to wiring contacts substantially remote from said heating elements.

These and other novel features of the device will be readily understood from a consideration of the following description taken together with the accompanying drawing wherein the device and wiring diagram therefor are illustrated in the several views in which the various parts thereof are identified by suitable reference characters in each of the views, and in which:

FIG. 2 is an end elevation substantially on the line 2—2 of FIG. 1 with the cover or end plate removed;

FIG. 3 is an enlarged sectional view of part of the construction shown in FIG. 1, indicating assembled arrangement of a sealing means with a rotatable tube of the device;

FIG. 4 is a partial sectional view similar to FIG. 3, showing the sealing element detached from the rotatable tube; and FIG. 5 is a schematic wiring diagram of the device.

Figure 1:
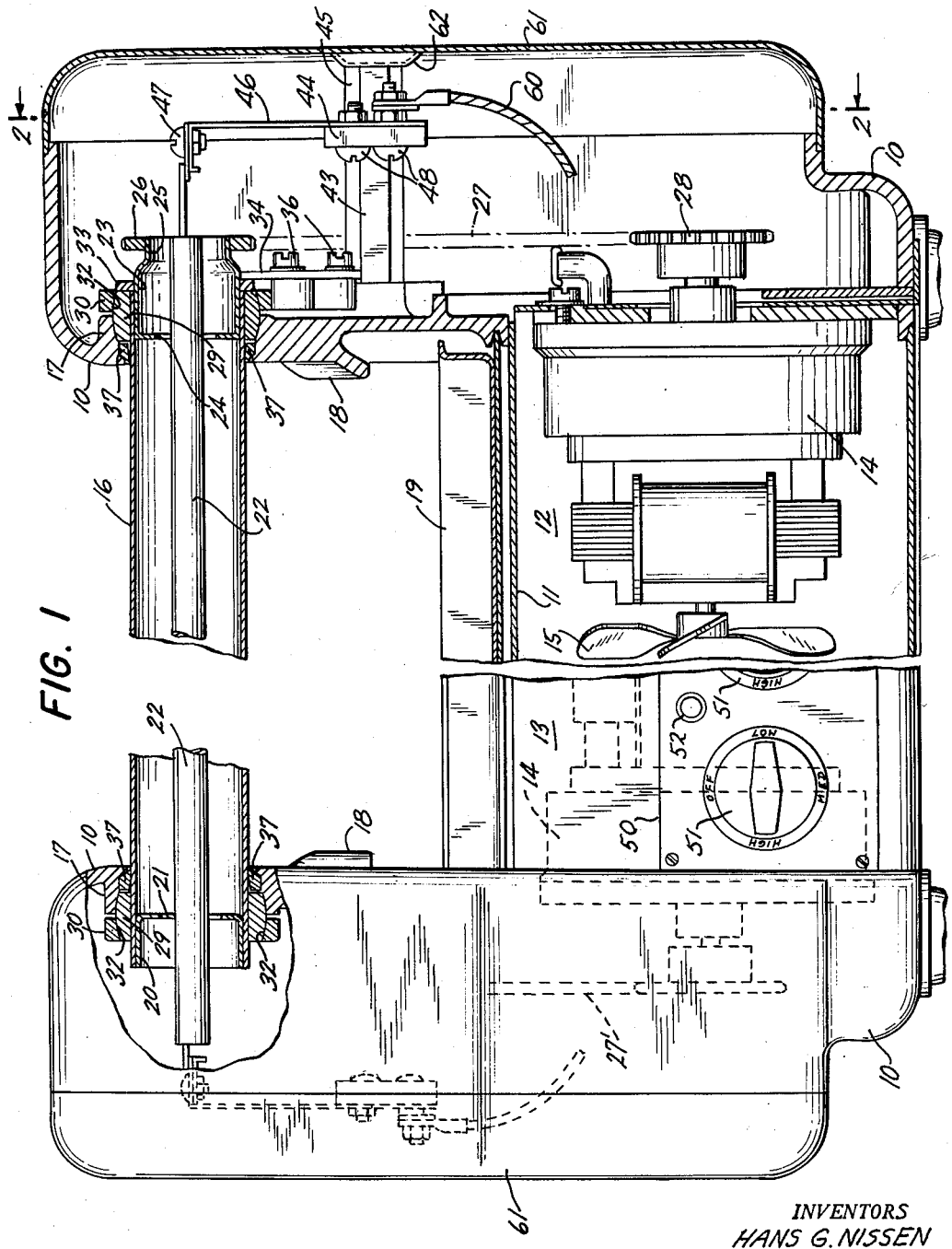
FIG. 1 is a condensed front elevation view of the device with part of the structure broken away and in section (substantially on the line 1—1 of FIG. 2)

As shown in FIGS. 1 and 2 of the drawing, the basic framework of the device comprises two identical end casing parts 10, suitably fashioned from cast aluminum or the like, joined together by an elongated central and lower casing part formed by an upper wall 11, rear wall 12, front wall 13, and readily removable bottom wall. This central casing part houses two drive motors 14, each carrying a circulating fan 15, with one of the motor units 14 being mounted on each of the end casings 10. The end of the central casing or distance between the end casing is a variable in construction of the device depending upon the capacity desired as a heater and roaster for frankfurters and the like.

Thus, for example, the device may be made up with spacings to receive tubes or rolls 16 which are 20 to 24 inches long in a small type unit or 30 to 36 inches long in a larger unit. The end casing parts 10 are provided across the upper portion thereof with a plurality of uniformly spaced apertures with inwardly extending peripheral bearing supports 17 for receiving and positioning the rolls 16. Below the rolls 16, integral with each casing part 10, is an inwardly and downwardly extending drip fin 18 protruding beyond the rolls 16 (note the dotted showing in FIG. 2 of the drawing) for guiding grease drippings from the rolls 16 into a removable drip pan 19.

The space that is provided between the rolls 16 and the drip pan 19 is such that with or without removal of the drip pan 19 the operator can have free access to the space below the rolls 16 for removing grease drippings and cleaning all exposed parts of the device.

One end of each of the tubes 16 is provided with an end cap 20 closely engaging inner surfaces of the tube 16 and having an enlarged aperture 21 through which freely passes an elongated heating element 22. The other end of each tube 16 is provided with a modified form of end cap 23 also having an aperture 24 to receive the heating element 22. The end cap 23 protrudes beyond the end of the tube 16 as a reduced tubular portion 25 carrying a sprocket 26. The sprockets 26 on a plurality of tubes 16 (four such sprockets as shown in FIG. 2 of the drawing) are engaged by a drive chain 27 passing around a suitable sprocket 28 driven by the motor 14.

As shown in the drawing, the tubes 16 are arranged in two banks of four with one bank oriented to be driven by a motor at one end of the device and the other bank being oriented to be driven through chain 27' by the motor at the opposite end of the device. This arrangement of separate banks of rolls driven from opposed ends of the device provides numerous advantages in construction and maintenance as will be apparent from further description of the device. Briefly, however, such construction permits the use of identical or interchangeable parts as the two end casings 10, and otherwise permits the use of identical structures and arrangements at both ends of the device. In addition, the use of separate banks of rolls facilitates the handling of local repairs and further permits the device to be used at half capacity by driving and heating only one set of rolls.

Externally of the tubes 16 in alignment with the end caps 20 and 24 are bearings 29 having an externally arcuate cross-section, seating partly within the bearing supports 17 and partly engaged by retaining means, in the form of apertured plates 30 secured by screws or the like 31 to the end casing 10 and having inner arcuate contours 32 held in close engagement with the bearing 29. The apertures in the plates 30 are of a size to pass over the sprockets 26 when attaching and detaching the plates 30.

The arcuate bearings 29 and the co-acting parts as above described provide a self-aligning support for the tubes 16, permitting smooth operation even if axial alignment of the two end casings 10 may be slightly off through faulty assemblage or damage in use.

The driven ends of the tubes 16 are provided with flanges 33 welded or otherwise fixedly secured thereto which position the tubes and support the same against longitudinal movement by engagement with a multiple yoke part 34 having semi-circular cutouts 35 and mounted on the casing 10 by suitable screws 36. The engagement between the yoke part 34 and the flanges 33 is not a tight engagement but rather one which will permit very limited longitudinal movement of the tubes 16.

An important feature of our improved construction is the special packing or sealing provided between the tube 16 and the casing part 10 adjacent the bearing 29. This sealing means is in the form of a flexible plastic ring 37 having cross-sectional contour when assembled, as shown in FIG. 3 of the drawing, and when detached, as shown in FIG. 4 of the drawing. Having reference to these two figures, it will be noted that the casing part 10 is provided with an aperture 38 slightly larger than the tube 16 into which the small end 39 of the sealing element is arranged. The sealing ring 37 is provided with a bore 40 tapered to reduced diameter adjacent the end 39 which is smaller than the outside diameter of the tube 16 so that as the sealing ring 37 is forced onto the tube 16 the end 39 thereof is deflected or offset as seen in FIG. 3 of the drawing, thereby providing an effective barrier to passage of grease along the tube 16 beyond the sealing ring 37. In addition, it will be noted that the outer shoulder 41 on the ring 37, closely engaging an annular recessed portion 42 in the casing part 10, provides a further effective barrier to grease passing beyond the ring 37. It will be understood, of course, that each of the tubes 16 is provided with a sealing ring 37 at each end thereof, and it has been found that the structure and arrangement of the sealing ring 37 very effectively prevents grease which may collect on the rolls 16 from getting into the enclosures provided by the end casings 10. Various heat and oil resistant plastics can be employed in the ring 37, excellent results being achieved with a fluorocarbon plastic such as products commercially available under the trademark Teflon.

Each end of the device is provided with front and rear studs 43 to which holding bars 44 are clamped by the bolts or nuts shown at 45. The holding bar 44 is fashioned of durable dielectric material and has adjustably secured thereto a plurality of resilient connector members 46 with offset ends 47 detachably engaging ends of the heating elements 22. The resilient connectors 46 are thus normally electrically insulated one from the other and permit accurate adjustment and positioning of the heater elements to orient them centrally of the respective tubes 16. At the same time, by reason of the resilient structure of the connectors 46, the heater elements are supported in a pre-determined longitudinal position, with respect to the tubes 16, with the connectors 46 at opposed ends of each element 22 compensating uniformly for expansion and contraction which may result in heating and cooling of the element 22. The adjustable mounting of the connectors 46 is suitably provided by pairs of bolts 48 extending through slightly oversized apertures at appropriately positioned spaced points in the holding bar 44.

At the driven ends of the tubes 16 the several connectors 46 are joined together by an electrically conductive plate or connector 49, so that one electrical connection communicates with the heating element in each tube, whereas at the free ends of the tubes each of the connectors 46 is independently wired to the control circuit, as will hereinafter be described.

At the front of the device and for controlling the operation thereof we provide a control panel 50, having separate control switches 51 and indicator lights 52 for each drive motor and associated group of four heating elements and rolls. As indicated in the drawing, the switches 51 provide for adjustments from an off position to low, medium and high heat positions. In this connection, attention is directed to the schematic showing in FIG. 5 of the drawing of the wiring diagram for the device.

The switches 51 are each shown as having line terminals $L_1$ and $L_2$ which are connected through a suitable extension 53 to a source of electrical current. The switches 51 also have terminals 1, 2 and 3 which are selectively connected in the manner shown with terminals $L_1$ and $L_2$ to provide low, medium and high heat.

It will be noted that with any heat adjustment terminal $L_1$ is connected with terminal 1, establishing a circuit through line 54 to the motor 14 which, in turn, is connected by return line 55 to terminal $L_2$. A second line 56 from terminal 1 leads to the indicator lamp 52 with a return line 57 to switch terminal $L_2$.

A third line 58 from terminal 1 connects through branches 58a and 58b with two spaced heating elements 22a and 22c. A single line 59 from terminal 2 connects through branches 59a and 59b with the other two spaced heating elements 22b and 22d. Terminal 3 is connected through line 60 with the connector 49 which joins the opposed ends of heating elements 22a, b, c and d.

From the schematic showing of the internal connections for low, medium and high heat, it will be evident that in the low heat adjustment of either switch 51 with terminal $L_2$ connected with terminal 2, heating element 22a is placed in series with 22b and heating elements 22c is placed in series with 22d. In the medium heat position, in which terminal $L_2$ is connected with terminal $L_3$, only heating elements 22a and 22c are actuated, these being in parallel circuit to provide maximum heat from each element. In the high heat position, in which terminal $L_1$ is connected with terminal 2 and terminal $L_2$ is connected with terminal 3, all four of the heating elements controlled by a single switch 51 are placed in parallel circuit.

Since in each setting of the switch 51 terminal $L_1$ is connected with terminal 1, it will be evident that the motor and signal light 52 are similarly actuated whether the switch is in low, medium or high heat position. It will further be recognized that with separate adjustments of the two switches 51, as shown, each controlling the heating of rolls 16 over one half of the device, it is possible to provide a substantial number of different combinations in the heat adjustments over the working surface of the device to accommodate for varying demands in the roasting of frankfurters or heating of other cylindrical articles.

It will be evident from the foregoing description that our device incorporates a duplication of identical and interchangeable parts at opposed ends of the device, thereby minimizing manufacturing costs and facilitating construction and maintenance operations. In this connection, it will be noted that the ends of the device are closed by identical cover members 61 suitably having inward projections 62 in alignment with the nuts or bolts 45 to act as spacers, preventing inadvertent flexure of the cover 61 into engagement with the wires and connectors mounted on the holding bar 44.

It should be emphasized that a primary feature of our improved device resides in the combination of the resilient supporting and positioning means for the heating elements, as provided by the resilient connectors 46, and the minimizing of heat transmittal to the wiring due to heat loss through radiation from the connectors 46.

Various changes and modifications in the heating and roasting device as herein described will occur to those skilled in the art, and to the extent that such changes and modifications are embraced by the appended claims, it is to be understood that they constitute part of our invention.

We claim:

1. An elongated heating and roasting device for cylindrical articles comprising a plurality of collectively driven tubular rolls rotatably mounted in and extending through spaced frame parts, said rolls being in closely spaced parallel relationship and in horizontal axial alignment along the upper portion of said device, each of said frame parts having on the outer surface thereof, electrically insulated therefrom and horizontally disposed substantially below said rolls, a rigid support, each of said supports carrying a plurality of elongated upwardly extending, and electrically conductive resilient connectors adjustably secured thereto with the upper ends in alignment with said rolls, and elongated small diameter heating elements extending through each of said rolls with the ends thereof detachably secured under resilient tension to said connector ends, said heating elements being detached from said rolls and accurately positioned axially thereof by adjustment of said connectors, and electrical wiring for said device being coupled with said connectors at said rigid support whereby heat transfer from said heating elements to said wiring is minimized.

2. An electrical heating and roasting device, as defined in claim 1, wherein said rolls are arranged in two banks, each containing an equivalent number of rolls, the rolls in said banks being driven by separate motors at opposed ends of the device, and the frame parts supporting said rolls and motors at opposed ends of the device being identical and interchangeable.

3. An electrical heating and roasting device, as defined in claim 1, wherein opposed ends of said rolls are enveloped by bearing members having an arcuate external contour cooperating with arcuate recesses in said frame parts, thereby providing a self-aligning mounting of said rolls in the device.

4. An electrical heating and roasting device, as defined in claim 1, wherein driven ends of said rolls are provided with radially protruding collars disposed between the adjacent frame part and yoke means detachably secured to the outer face of said frame part for preventing longitudinal displacement of said rolls.

5. An electrical heating and roasting device, as defined in claim 1, wherein resilient sealing means is provided circumferentially of each roll at its point of engagement with each frame part, confining grease and like material collecting on said rolls to the portion thereof between said frame parts, said resilient sealing means comprising a formed plastic ring having a tapered inner contour extending from a larger inner diameter at one end thereof in alignment with a shoulder part thereon for sealing engagement with said frame to a smaller inner diameter at the other end thereof in alignment with a relatively thin circumferential fin adapted to be radially expanded for close sealing engagement with said roll.

6. In a heating and roasting device of the character described, spaced frame parts, elongated cylindrical rolls of substantially uniform diameter throughout their length, said rolls extending between and through said frame parts, said frame parts engaging the outer cylindrical surface of and rotatably supporting said rolls, means for heating said rolls, resilient sealing means disposed circumferentially of each roll end at its point of engagement with each frame part, confining grease and like material collecting on said rolls to the portion thereof between said frame parts, said resilient sealing means being a formed plastic ring having a tapered contour extending from a larger diameter at one end thereof in alignment with a shoulder part thereon for sealing engagement with the associated frame part to a smaller diameter at the other end thereof in alignment with a relatively thin expanded part in close sealing engagement with the cylindrical surface of said roll.

References Cited in the file of this patent

UNITED STATES PATENTS

| | | |
|---|---|---|
| 1,903,483 | Skillman | Apr. 11, 1933 |
| 2,178,419 | Clark et al. | Oct. 31, 1939 |
| 2,185,979 | Dumas | Jan. 2, 1940 |
| 2,328,676 | Rich | Sept. 7, 1943 |
| 2,501,075 | Miller | Mar. 21, 1950 |
| 2,696,162 | Michaelis | Dec. 7, 1954 |
| 2,746,781 | Jones | May 22, 1956 |
| 2,776,173 | Rudy | Jan. 1, 1957 |